United States Patent [19]

Ash

[11] Patent Number: 5,175,243
[45] Date of Patent: Dec. 29, 1992

[54] PROCESS FOR PREPARING ARYLENE SULFIDE POLYMERS WITH HALO BENZENE CONTAINING DEACTIVATING GROUP

[75] Inventor: Carlton E. Ash, Bartlesville, Okla.

[73] Assignee: Phillips Petroleum Company, Bartlesville, Okla.

[21] Appl. No.: 612,658

[22] Filed: Nov. 14, 1990

[51] Int. Cl.⁵ ............................................. C08G 75/16
[52] U.S. Cl. .................................... 528/388; 528/387
[58] Field of Search ............................... 528/388, 387

[56] References Cited

U.S. PATENT DOCUMENTS

| | | | |
|---|---|---|---|
| 3,354,129 | 11/1967 | Edmonds, Jr. et al. | 268/79 |
| 3,524,835 | 8/1970 | Edmonds, Jr. et al. | 260/79.1 |
| 3,800,845 | 4/1974 | Scoggin | 159/47 |
| 4,337,182 | 6/1982 | Needham | 524/609 |
| 4,415,729 | 11/1983 | Scoggins et al. | 528/388 |
| 4,440,915 | 4/1984 | Asakura et al. | 525/537 |
| 4,482,665 | 11/1984 | Dix | 524/262 |
| 4,486,578 | 12/1984 | Asakura et al. | 525/535 |
| 4,605,713 | 8/1986 | Heitz et al. | 525/537 |
| 4,605,732 | 8/1986 | Heitz et al. | 528/388 |
| 4,760,127 | 7/1988 | Ebert et al. | 528/388 |
| 4,767,841 | 8/1988 | Goetz et al. | 528/388 |
| 4,771,120 | 9/1988 | Alewelt et al. | 528/388 |

FOREIGN PATENT DOCUMENTS

3529498A1 2/1987 Fed. Rep. of Germany .
63-305131 12/1988 Japan .

OTHER PUBLICATIONS

Bunnett, Joseph F., Journal of Chemical Education, vol. 51, No. 5, pp. 312–315 (May 1974).
Gordon, Arnold J. and Ford, Richard A., The Chemists' Companion, John Wiley & Sons, pp. 144–147, (1972).

Primary Examiner—Harold D. Anderson
Attorney, Agent, or Firm—Beverly M. Dollar

[57] ABSTRACT

An arylene sulfide polymer and a process for preparing same by contacting a sulfur source, a cyclic organic amide and a dihaloaromatic compound to produce a polymerization mixture, polymerizing the polymerization mixture and recovering the arylene sulfide polymer wherein the process is conducted in the presence of a compound having the formula

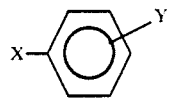

wherein X is selected from the group consisting of bromine and iodine, Y is a non-activating or deactivating group and is selected from the group consisting of

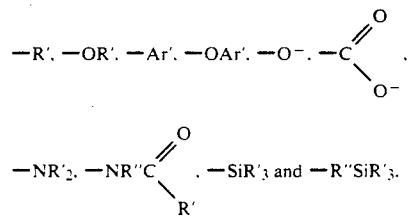

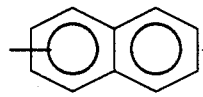

R' and R" are hydrogen or an alkyl group having 1 to about 15 carbon atoms, and Ar' is selected from the group consisting of 18 Claims, 1 Drawing Sheet

PROCESS FOR PREPARING ARYLENE SULFIDE POLYMERS WITH HALO BENZENE CONTAINING DEACTIVATING GROUP

BACKGROUND OF THE INVENTION

This invention relates to the production of arylene sulfide polymers. In one aspect, this invention relates to the production of phenylene sulfide polymers. In another aspect, this invention relates to the production of arylene sulfide polymers having a high extrusion rate. In a further aspect, this invention relates to the production of arylene sulfide polymers in which the functionality of the polymer end groups is controllable. In a still further aspect, this invention relates to arylene sulfide polymers having functionalized end groups.

A basic process for the production of arylene sulfide polymers from polyhalo-substituted aromatic compounds by reaction with an alkali metal sulfide in the presence of a polar organic compound is disclosed in U.S. Pat. No. 3,354,129. This patent also discloses that the molecular weight of the arylene sulfide polymers can be reduced by the use of monohalo-substituted aromatic compounds as chain terminating agents or by the use of an excess of one of the reactants, such as p-dichlorobenzene, in the polymerization reaction mixture. The use of excess dihalo-substituted aromatic compound reactant suffers from the disadvantages of increased cost of added reactant materials, difficulty in polymer recovery, and the need for recovering and recycling excess dihalo-substituted aromatic compound to the polymerization zone. In addition, previous attempts to employ monohalo-substituted aromatic compounds as chain terminating agents to obtain arylene sulfide polymers of reduced molecular weight have given generally unsatisfactory results because: (1) either the monohalo compound was so unreactive that it could not compete with the polyhalo-substituted aromatic compound monomer and thus had essentially no effect on the polymer produced in its presence, or (2) the monohalo compound, while activated relative to the polyhalo-substituted aromatic compound, possessed an activating group which was unstable under polymerization and/or polymer recovery conditions thus promoting polymer instability, or (3) the monohalo compound, while activated relative to the polyhalo-substituted aromatic compound, was relatively expensive compared to the polyhalo-substituted aromatic compound.

Control of functionality of end groups of arylene sulfide polymers is typically done by endcapping. In general, endcapping is accomplished by addition of an endcapping agent to the polymerization mixture at or near the end of the polymerization cycle and prior to the polymer recovery steps. the endcapping agent may also be added to the polymerization mixture earlier in the polymerization cycle. The appropriate addition time is dependent on the relative reactivities of the starting materials and the endcapping agent, the polymerization temperature and the desired molecular weight of the arylene sulfide polymer. For example, endcapping can be typically described as the preparation of functionalized arylene sulfide polymers by addition to the polymerization mixture of a functionalized monohalo aromatic having enhanced halide reactivity and containing the desired functional group.

U.S. Pat. No. 4,486,578 discloses the use of activated chloro- or bromobenzenes as evidenced by positive Hammet $\sigma$ values to introduce the functionality to arylene sulfide polymers. The problem with endcapping arylene sulfide polymers is that one is limited to nucleophilic chemistry starting with a sulfur source, e.g. Na$_2$S, and a dihaloaromatic, e.g. dihalobenzene. Generally, for nucleophilic reactions to displace halogen on a phenyl ring requires that it be activated by an electron accepting or attractive substituent somewhere on the ring. Such activating substituents can be deduced by looking at Hammett $\sigma$ values. Hammett $\sigma$ values which are positive (+) are considered electron accepting (activating) whereas a negative (−) value is electron donating (deactivating) and a value of 0 indicates no activation. While U.S. Pat. No. 4,486,578 also discloses the —COOH group, it is not applicable as an activating substituent as required in that patent because this form does not exist under arylene sulfide polymerization conditions. Instead, the salt form is present and the salt form would not be expected to react since it is not activating according to the criteria of U.S. Pat. No. 4,486,578.

It has now been unexpectedly discovered that non-activated or deactivated bromo- and iodobenzenes, i.e. Hammett $\sigma$ values which are 0 or negative respectively, are especially effective for endcapping arylene sulfide polymers to control the molecular weight of the arylene sulfide polymer and/or to introduce functionality to the arylene sulfide polymer chain.

Arylene sulfide polymers can be characterized at least in part in terms of a melt flow rate. It is generally considered that a melt flow rate is inversely related to molecular weight for polymeric materials in general and for arylene sulfide polymers in particular. Extrusion rate, which is more specifically defined hereinafter, is a specific type of melt flow rate which is particularly useful for characterizing arylene sulfide polymers in the lower molecular weight range.

Arylene sulfide polymers having a relatively high extrusion rate are desirable for a variety of applications such as encapsulation of electronic components and coating formulations. For example, U.S. Pat. Nos. 4,437,182 and 4,482,665 provide exemplary disclosures of compositions comprising arylene sulfide polymers which are employed in the encapsulation of electronic components.

Arylene sulfide polymers in which the functionality of the polymer end groups is controllable are desirable for improving surface adhesion properties of the polymer to metal substrates and/or fiber reinforcement. Such functionalized polymers are also desirable for increasing the crystallization rate of arylene sulfide polymers and for use in the preparation of copolymers by reaction at the polymer end groups having the desired functionality. The copolymers would be particularly useful as compatibilizers in polymer blends.

SUMMARY OF THE INVENTION

It is an object of the invention to provide a process for producing arylene sulfide polymer of a desired extrusion rate in a readily controllable manner. It is a further object of the invention to provide a process for producing arylene sulfide polymer in which the functionality of the polymer end groups is readily controllable. It is yet a further object of the invention to provide an arylene sulfide polymer composition having functionalized end groups.

According to the invention, a process for preparing arylene sulfide polymers is provided which comprises contacting at least one sulfur source, at least one cyclic organic amide, and at least one dihaloaromatic compound to form a polymerization mixture, subjecting the polymerization mixture to polymerization conditions of temperature and time sufficient to form the arylene sulfide polymer, and recovering the arylene sulfide polymer, wherein the process is conducted in the presence of a substituted bromo- or iodobenzene wherein the substituent is a non-activating or deactivating group. In a further embodiment, the substituted bromo- or iodobenzene may be added with at least one dihaloaromatic compound to produce the polymerization mixture, or during the time the polymerization mixture is being subjected to polymerization conditions.

Further according to the invention, an arylene sulfide polymer composition is provided having end groups comprising the structure wherein Y is a non-activating or deactivating group and is selected from the group consisting of R' and R" are hydrogen or an alkyl group having 1 to about 15 carbon atoms, and Ar' is selected from the group consisting of

DETAILED DESCRIPTION OF THE INVENTION

This invention relates to arylene sulfide polymer compositions and a process for preparing arylene sulfide polymers having a readily controllable molecular weight as measured by extrusion rate and/or polymer end group functionality which is readily controllable comprising the steps of: (a) contacting at least one sulfur source, at least one cyclic organic amide, and at least one dihaloaromatic compound to form a polymerization mixture, (b) subjecting the polymerization mixture to polymerization conditions of temperature and time sufficient to form the arylene sulfide polymer, and (c) recovering the arylene sulfide polymer, wherein the process is conducted in the presence of a compound having the formula wherein X is selected from the group consisting of bromine and iodine, Y is a non-activating or deactivating group and is selected from the group consisting of R' and R" are hydrogen or an alkyl group having 1 to about 15 carbon atoms, and Ar' is selected from the group consisting of The arylene sulfide polymers having a relatively high extrusion rate made according to this invention are readily recoverable and well suited for use in applications where such relatively high extrusion rate arylene sulfide polymers are desired, e.g. encapsulation of electronic components and coatings. The arylene sulfide polymers having polymer end groups of desired functionality made according to this invention are readily recoverable and well suited for use in applications where such polymer end group functionality is desired, e.g. improved adhesion to metal substrates and/or fiber reinforcement, increased crystallization rate and in the preparation of copolymers for use as blend compatibilizers.

The term "arylene sulfide polymer" is defined by the formula wherein —Ar—S— is the repeating unit, i is the number of repeating units in the polymer molecule, and Ar is selected from the group consisting of wherein each R is selected from the group consisting of hydrogen and alkyl radicals having 1 to about 4 carbon atoms, the total number of carbon atoms in all of the R groups in the repeat unit being 0 to about 12.

As used throughout the specification, the term "extrusion rate" refers to a flow rate measurement on molten polymer based on ASTM D 1238-86, Condition 315/0.345 modified to use an orifice having a length of 31.8 mm and a 5 minute preheat time. As previously discussed, extrusion rate is a specific type of melt flow measurement which is particularly useful in characterizing arylene sulfide polymers in the lower molecular weight range.

The compound which is utilized according to the invention is represented by the formula wherein X is selected from the group consisting of bromine and iodine. Y is a non-activating or deactivating group and is selected from the group consisting of R and R' are hydrogen or an alkyl group having 1 to about 15 carbon atoms, and Ar' is selected from the group consisting of A Y group of can be obtained by addition of the corresponding carboxylate salt or it can be prepared in-situ by reaction of the free carboxylic acid with a stoichiometric amount of a base, e.g. and alkali metal hydroxide. A Y group of —O⁻ can be obtained by addition of the corresponding phenoxide or it can be prepared in-situ by reaction of the corresponding phenol with a stoichiometric amount of base, e.g. an alkali metal hydroxide. The Y groups can be characterized as non-activating or deactivating by looking at Hammett $\sigma$ values. Hammett $\sigma$ values which are negative indicate electron donating groups, i.e. deactivating, and Hammet $\sigma$ values of 0 indicate groups having no activation. Hammett $\sigma$ values can be found in *The Chemist's Companion*, John Wiley & Sons, pp. 145–47 (1972) which is hereby incorporated by reference herein.

Examples of suitable compounds which can be employed in the process of the invention include bromobenzene, iodobenzene, 4-bromoaniline, 4-iodoaniline, 4-bromoanisole, 4-iodoanisole, 3-bromoaniline, 3-iodoaniline,

4-bromodiphenylether, 1-bromo-4-ethylbenzene, 4-bromophenol, 4-iodophenol, 4-bromobiphenyl, 4-bromophenyltrimethylsilane, 4-bromotoluene, and 4-iodotoluene, and the like, and mixtures of any two or more thereof. The presently preferred compounds are bromobenzene, iodobenzene, because of their effectiveness.

The amount of compound employed according to the process of the invention can be conveniently expressed in terms of a molar ratio based on the sulfur source. Broadly the molar ratio of compound to sulfur source will be about 0.002:1 to about 0.2:1, preferably about 0.004:1 to about 0.1:1, and most preferably about 0.006:1 to about 0.05:1. The compound will be effective in the process of the invention when added with at least one dihaloaromatic compound to produce the polymerization mixture, or during the time the polymerization mixture is being subjected to polymerization conditions.

The dihaloaromatic compounds which are employed according to the invention are compounds having 6 to about 22 carbon atoms per molecule. The halogen substituent on the dihaloaromatic compound can be selected from the group consisting of chlorine, bromine and iodine. Preferably, the dihaloaromatic compound will be dihalo-substituted benzene and more preferably dichloro-substituted benzene. Particularly good results are expected when the dihaloaromatic compound is selected from the group consisting of p-dichlorobenzene and mixtures of p-dichlorobenzene with a total of about 0 to about 10 mole percent of at least one of m-dichlorobenzene, o-dichlorobenzene and alkyl-substituted dichlorobenzene having the formula wherein R is as defined herein and at least one R is not hydrogen.

Examples of some suitable dihaloaromatic compounds include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1,2,4,5-tetrabutyl-3,6-dichlorobenzene, 1-ethyl-3-butyl-2,5-dichlorobenzene, 1-ethyl-2,5-diiodobenzene, 1-butyl-2,5-dichlorobenzene, 1-butyl-4-ethyl-2,5-dibromobenzene, o-dichlorobenzene, m-dichlorobenzene and the like, and mixtures of any two or more thereof. The presently preferred dihaloaromatic compound is p-dichlorobenzene because of its effectiveness and commercial availability.

The cyclic organic amide used in the process of the invention should be substantially liquid at the reaction temperatures and pressures employed. The cyclic organic amides can have 5 to about 12 carbon atoms per molecule. Examples of some suitable cyclic organic amides include N,N'-ethylenedipyrrolidone, N-methyl-2-pyrrolidone, pyrrolidone, caprolactam, N-ethyl caprolactam, N-methyl caprolactam and mixtures thereof. The presently preferred cyclic organic amide is N-methyl-2-pyrrolidone because of its effectiveness and commercial availability. The amount of cyclic organic amide employed according to the process of the invention can be expressed in terms of a molar ratio of cyclic organic amide to sulfur source compounds. Broadly, the molar ratio of cyclic organic amide to sulfur source compound will be about 1.5:1 to about 25:1, preferably about 2:1 to about 8:1.

In accordance with the invention, suitable sulfur sources which can be employed in the production of the arylene sulfide polymers include alkali metal sulfides, alkali metal bisulfides, N-methyl-2-pyrrolidinethione, and hydrogen sulfide. Further according to the invention, the alkali metal sulfides can be employed with good results in the absence of any added alkali metal hydroxide whereas the other suitable sulfur sources are preferably employed in the process of the invention in the presence of an added alkali metal hydroxide. For the alkali metal bisulfides and N-methyl-2-pyrrolidinethione, the amount of added alkali metal hydroxide will generally be in the range of from about 0.3:1 to about 4:1, preferably about 0.4:1 to about 2:1 moles per mole of alkali metal bisulfides or N-methyl-2-pyrrolidinethione. When hydrogen sulfide is employed as the sulfur source, the amount of added alkali metal hydroxide is generally within the range of about 1.3:1 to about 5:1 preferably about 1.4:1 to about 3:1 moles per mole of hydrogen sulfide employed.

Alkali metal hydroxides that can be employed according to the invention include lithium hydroxide, sodium hydroxide, potassium hydroxide, rubidium hydroxide, cesium hydroxide, and mixtures thereof. Sodium hydroxide is preferred because of ready availability and good results obtained using this compound. The alkali metal hydroxide can conveniently be utilized in the process of the invention as an aqueous solution. For example, an aqueous solution of sodium hydroxide having about 50 weight percent sodium hydroxide is convenient to use.

Alkali metal bisulfides that can be employed according to the invention include sodium bisulfide, lithium bisulfide, potassium bisulfide, rubidium bisulfide, cesium bisulfide, and mixtures thereof. Sodium bisulfide is preferred because of ready availability and good results obtained therewith. The alkali metal bisulfide can conveniently be utilized in the process of the invention as an aqueous solution. For example, an aqueous solution of sodium bisulfide having about 60 weight percent sodium bisulfide is convenient to use.

Alkali metal sulfides which can be employed in the process of the invention include lithium sulfide, sodium sulfide, potassium sulfide, rubidium sulfide, cesium sulfide, and mixtures thereof. The alkali metal sulfide can be used in anhydrous form, as a hydrate, or as an aqueous mixture. Sodium sulfide is preferred because of ready availability and good results obtained therewith.

While the ratio of reactants for the preparation of arylene sulfide polymers according to the invention can vary considerably, the ratio of moles of dihaloaromatic compound to atoms of divalent sulfur in the sulfur source should be within the range of about 0.8:1 to about 2:1, preferably about 0.95:1 to about 1.3:1.

In another embodiment of the invention, a polymerization modifier such as an alkali metal carboxylate can be employed in the process of the invention. The alkali metal carboxylates that can be employed in the process of the invention can be represented by the formula $R'''CO_2M$ where $R'''$ is a hydrocarbly radical selected from alkyl, cycloalkyl, and aryl and combinations thereof such as alkaryl, aralkyl, and the like, the number of carbon atoms in said $R'''$ being within the range of 1 to about 20, and M is an alkali metal selected from lithium, sodium, potassium, rubidium, and cesium.

Examples of some alkali metal carboxylates that can be employed in the process of the invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyl octanoate, potassium dodecanoate, rubidium 4-ethyltetradecanoate, sodium octadecanoate, sodium heneicosanoate, lithium cyclohexane carboxylate, cesium cyclododecane carboxylate, sodium 3-methylcyclopentane carboxylate, potassium cyclohexylacetate, potassium benzoate, lithium benzoate, sodium benzoate, potassium m-toluate, lithium phenylacetate, sodium 4-phenylcyclohexane carboxylate, potassium p-tolylacetate, lithium 4-ethylcyclohexylacetate and the like and mixtures thereof. The presently preferred alkali metal carboxylate is sodium acetate because of its effectiveness and commercial availability.

The amount of alkali metal carboxylate employed according to the invention can be expressed in terms of molar ratio based on the sulfur source compound employed. Broadly, the molar ratio of alkali metal carboxylate to sulfur source compound will be from about 0.002:1 to about 4:1, preferably 0.1:1 to about 2:1. The alkali metal carboxylate can be used in anhydrous form, as a hydrate, or as an aqueous mixture.

Suitable polymerization conditions include a reaction temperature which can vary over a wide range but will generally be within the range of about 200° C. to about 450° C., preferably from about 210° C. to about 350° C. The reaction time will be within the range of about 10 minutes to about 72 hours and preferably about 1 hour to about 8 hours. The pressure need only be sufficient to maintain the dihaloaromatic compound and the cyclic organic amide substantially in the liquid phase, and to substantially retain the sulfur source therein.

Although various known methods can be employed for the recovery of the arylene sulfide polymers made according to the invention, it is preferred to employ a method, such as the one described in U.S. Pat. No. 3,800,845, wherein the heated polymerization mixture is subjected to an isothermal evaporation reducing the pressure on the polymerization mixture from reaction pressure sufficiently to evaporate essentially all of the water and approximately one third of the cyclic organic amide and then removing the concentrated polymerization mixture to another vessel flashing the mixture adiabatically to about atmospheric pressure to remove essentially all the cyclic organic amide from the arylene sulfide polymer. The flashed reaction mixture residue can be slurried with a liquid diluent such as water in which the alkali metal halides and other impurities are soluble. The liquid diluent is removed with dissolved impurities such as by filtration leaving a particular arylene sulfide polymer. This washing process can be repeated until the desired level of arylene sulfide polymer purity is attained. Another known method that can be employed is the "water quench" process described in U.S. Pat. No. 4,415,729, wherein the polymerization mixture is contacted at a temperature above that at which the arylene sulfide polymer is soluble in the polymerization mixture with a sufficient amount of a separation agent that is soluble in the cyclic organic amide and is a non-solvent for the arylene sulfide polymer, e.g. water, to cause or enhance a phase separation. Subsequent cooling of the quenched, phase-separated mixture produces a slurry of particulate arylene sulfide polymer in the cyclic organic amide which can be filtered to recover the particulate arylene sulfide polymer. The separated polymer can be washed as described above.

The arylene sulfide polymer composition will have end groups comprising the structure wherein Y is a non-activating or deactivating group and is selected from the group consisting of R' and R" are hydrogen or an alkyl group having 1 to about 15 carbon atoms and Ar' is selected from the group consisting of

EXAMPLES

In the following examples, the term, "melt flow" refers to a melt flow rate for polyphenylene sulfide (PPS) based on ASTM D 1238-86, Condition 315/5.0, modified to use a 5 minute preheat time. The term "extrusion rate" refers to a melt flow rate for PPS based on ASTM D 1238-86, Condition 315/0.345, modified to use an oriface with a length of 31.8 mm and a 5 minute preheat time. The units of melt flow and extrusion rate are g/10 min.

Polymer thermal transitions were determined on a Perkin-Elmer Differential Scanning Calorimeter, Model DSC-2C. The DSC scans were made in nitrogen at 20° C./min. using melted and quenched samples for the glass transitions (Tg), crystallization temperatures (Tcc), and melting temperatures (Tm). Crystallization temperatures from the melt (Tmc) were determined by cooling at 20° C./min after a 5 minute hold at 320° C.

EXAMPLE 1

This example describes a series of PPS polymerizations that demonstrate the effect of the presence of iodobenzene on the PPS product. The first PPS polymerization run is a control run made without any added iodobenzene. Iodobenzene was added in varying levels to the next 5 runs.

In run 1, a one-liter, titanium reactor was charged with 1.0 g-mol sodium bisulfide (NaSH) as an aqueous solution containing about 60 weight percent NaSH, 1.0 g-mol sodium hydroxide (NaOH), and 2.5 g-mol N-methyl-2-pyrrolidone (NMP). The reactor stirrer was started and the reactor was purged with nitrogen. After the reactor temperature had been increased to about 150° C., dehydration was carried out to remove water as the reactor temperature increased to about 205° C.

To the dehydrated mixture in the reactor was added 1.01 g-mol p-dichlorobenzene (DCB) and 1.0 g-mol NMP. The reactor was heated to 235° C. and held for one hour. Then the reactor was heated to 265° C. and held at 265° C. for two hours. After the reactor had cooled, it was opened and the contents slurried in 2-propanol in a Waring blender. The suspension was filtered and the solid polymer was washed 6 times (approx. 1 L) with hot (approx. 80° C.) water. After the washed polymer was dried at 125° C. in a vacuum oven, Polymer 1 was recovered in a yield of 94 mole percent. The extrusion rate of Polymer 1 was 19.4 g/10 min.

Polymerization runs 2 through 6 were carried out by the same procedure as in run 1 except that iodobenzene was added to the dehydrated mixture with the DCB and NMP. The levels of iodobenzene ranged from 0.004 to 0.100 g-mol in the five runs. Table I summarized the iodobenzene levels and the results of the runs in this example.

TABLE I

Polymerization of PPS in the Presence of Iodobenzene

| Run | Iodobenzene. g-mol | PPS Yield. mole % | Extrusion Rate. g/10 min |
|---|---|---|---|
| 1 | 0 | 94 | 19.4 |
| 2 | 0.004 | 93 | 49.7 |
| 3 | 0.008 | 93 | 68.7 |
| 4 | 0.013 | 94 | 135 |
| 5 | 0.020 | 93 | 283 |
| 6 | 0.100 | 93 | 5435 |

These results demonstrate that the addition of iodobenzene to the polymerization results in increases in the extrusion rate over the control run 1 with higher levels of added iodobenzene giving higher extrusion rates. These results also demonstrate that the use of iodobenzene in the polymerization results in a process for producing poly(phenylene sulfide) of a desired extrusion rate in a readily controllable manner.

EXAMPLE 2

Another series of PPS polymerization runs was carried out to demonstrate the effect of bromobenzene on the PPS product. Run 7 is a control run made with no added bromobenzene and runs 8, 9, and 10 are invention runs made with added bromobenzene at levels of 0.006 to 0.020 g-mol.

All runs were carried out in a manner similar to that described in Example 1, except that the amount of NaOH was 1.01 g-mole. Control run 7 gave a PPS product in a 94 mole percent yield with an extrusion rate of 23.9 g/10 min. In runs 8, 9, and 10, bromobenzene was added to the dehydrated mixture with the DCB and NMP. The results of the polymerization runs are summarized in Table II.

TABLE II

Polymerization of PPS in the Presence of Bromobenzene

| Run | Bromobenzene. g-mol | PPS Yield. mole % | Extrusion Rate. g/10 min |
|---|---|---|---|
| 7 | 0 | 94 | 23.9 |
| 8 | 0.006 | 94 | 52.5 |
| 9 | 0.013 | 95 | 92 |
| 10 | 0.020 | 93 | 174 |

These results demonstrate that the addition of bromobenzene to the PPS polymerization gives products with higher extrusion rates than the control run 7. The extrusion rates increase with increasing bromobenzene levels. These results also demonstrate that the use of bromobenzene in the polymerization results in a process for producing poly(phenylene sulfide) of a desired extrusion rate in a readily controllable manner.

EXAMPLE 3

Several control PPS polymerization runs were carried out with chlorobenzene added to the polymerization mixture to demonstrate the relatively inert nature of chlorobenzene compared with iodobenzene and bromobenzene. Three runs were carried out using the procedure described in Example 1 except that chlorobenzene at three levels was added to the dehydrated mixture with the DCB and NMP. The results (Table III) show that the addition of chlorobenzene to the PPS polymerization has little effect on the product extrusion rate. A considerable amount of unreacted chlorobenzene was present in the final polymerization mixture as determined by GC analysis.

TABLE III

Polymerization of PPS in the Presence of Chlorobenzene

| Run | Chlorobenzene. g-mol | PPS Yield. mole % | Extrusion Rate. g/10 min |
|---|---|---|---|
| 11 | 0.008 | 94 | 31.9 |
| 12 | 0.012 | 94 | 26.8 |
| 13 | 0.020 | 94 | 30.4 |

Figure 1:
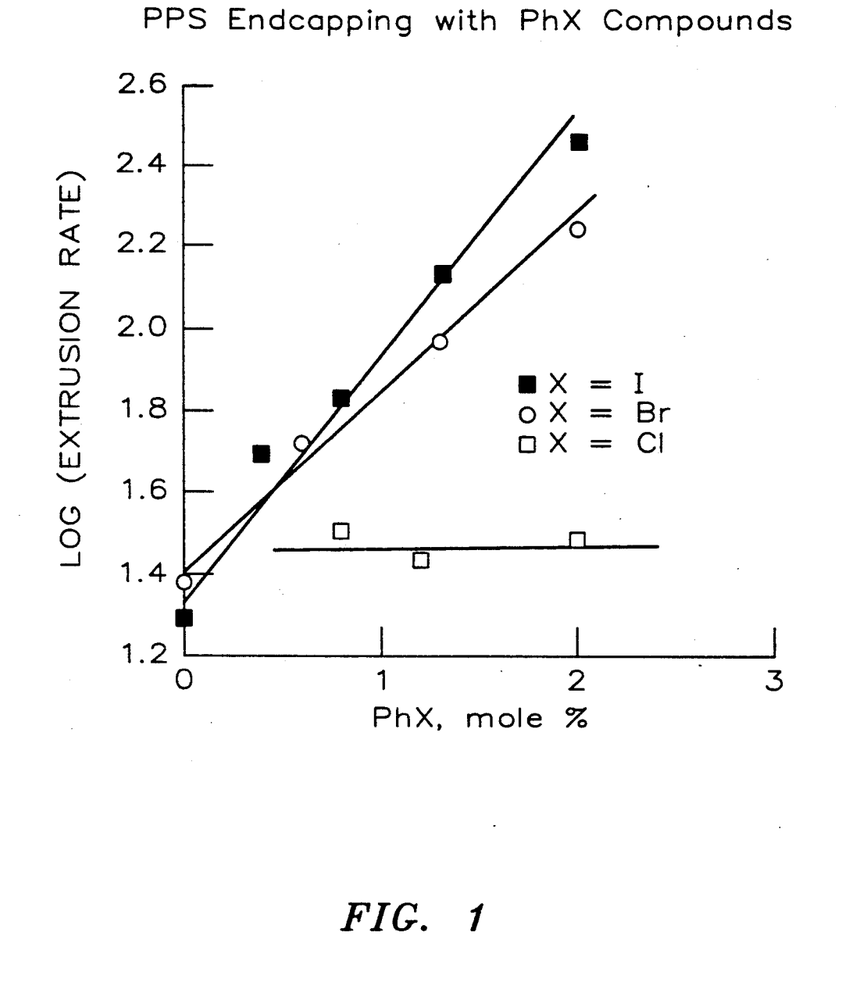
FIG. 1 is a plot demonstrating the effect of the level of iodobenzene, bromobenzene and chlorobenzene on poly(phenylene sulfide) molecular weight for polymerizations described in Examples 1-3.

To more clearly demonstrate the differences in the PPS produced in the presence of the iodo-, bromo- and chlorobenzenes, the results of Examples 1, 2, and 3 are plotted in FIG. 1. The level of the halobenzene (PhX, where Ph is phenyl and X is iodine, bromine, or chlorine) is plotted in mole percent based on the limiting reagent, e.g. NaSH, used against the logarithm of the extrusion rate of the resulting polymer. A comparison of the slopes of the lines of each set of halobenzene polymerizations clearly show that the iodo- and bromobenzenes give a substantial and essentially linear change in extrusion rate with changes in halobenzene concentration, whereas chlorobenzene does not change the extrusion rate significantly. In addition, the slopes of the lines clearly shows that iodobenzene is more effective than bromobenzene.

EXAMPLE 4

Several more control runs were done with the addition of fluorobenzene to a PPS polymerization. These runs were carried out in a procedure similar to the procedure in Example 1 except that in runs 15 and 16, 0.010 and 0.020 g-mol of fluorobenzene were added with the DCB and NMP charge to the dehydrated mixture. Run 14 does not have any fluorobenzene charged. The results are summarized in Table IV.

TABLE IV

Polymerization of PPS in the Presence of Fluorobenzene

| Run | Fluorobenzene. g-mol | PPS Yield. mole % | Extrusion Rate. g/10 min |
|---|---|---|---|
| 14 | 0 | 95 | 28 |
| 15 | 0.010 | 94 | 51 |
| 16 | 0.020 | 94 | 40.5 |

Fluorobenzene causes a very weak and unpredictable effect on the PPS extrusion rate compared with the results described in Examples 1 and 2 with iodo- and bromobenzene. The PPS extrusion rate is not a function of the level of fluorobenzene. Therefore, the use of fluorobenzene does not result in a readily controllable process for producing PPS of a desired extrusion rate.

EXAMPLE 5

Several PPS polymerization runs were done to determine the effect of haloaromatic carboxylic acid salts on the PPS extrusion rate. The polymerization runs were carried out as described in Example 2 except for the addition of 1.03 g-mol NaOH and 0.020 g-mol of p-chlorobenzoic acid, p-bromobenzoic acid, and p-iodobenzoic acid in runs 18, 19 and 20 respectively. The additional NaOH was used to neutralize the p-halobenzoic acid to the p-halobenzoate. Run 17 is a control run made without the addition of any halobenzoic acid. The results (Table V) show that p-bromobenzoate and p-iodobenzoate increase the extrusion rate significantly compared with the runs with p-chlorobenzoate or no halobenzoate.

TABLE V

Polymerization of PPS in the Presence of p-Halobenzoates

| Run | para-Halobenzoate | PPS Yield, mole % | Extrusion Rate, g/10 min |
|---|---|---|---|
| 17 | None | 96 | 20.8 |
| 18 | Chloro -[a] | 94 | 45 |
| 19 | Bromo -[a] | 95 | 71 |
| 20 | Iodo -[a] | 91 | 86.9 |

[a]0.020 g-mol

EXAMPLE 6

The effect of haloaromatic carboxylic acid salts on PPS polymerizations with alkali metal carboxylates was determined in this example. Run 21 was a control run made in a manner similar to that described for run 1, except that 0.30 g-mol sodium acetate was charged with the NaSH, NaOH, and NMP before the dehydration and the polymerization time at 265° C. was 3 hours instead of 2 hours. In invention run 22, the polymerization was carried out as in run 21, except that 1.03 g-mol NaOH was used and 0.02 g-mol p-iodobenzoic acid and 0.15 g-mol NMP were added to the polymerization mixture after 30 minutes of the one hour 235° C. hold. In invention run 23, the PPS polymerization was done as described in run 21, except that 1.03 g-mol NaOH was used and 0.02 g-mol of p-iodobenzoic acid was added to the reactor with the DCB and NMP charge to the dehydrated mixture. The additional NaOH was used to neutralize the p-iodobenzoic acid to p-iodobenzoate. The results of the three runs are summarized in Table VI.

TABLE VI

Polymerization of PPS in the Presence of p-Iodobenzoate

| Run | p-Iodobenzoate, g-mol | Melt Flow, g/10 min | Tg, °C. | Tcc, °C. | Tmc, °C. | Tm, °C. |
|---|---|---|---|---|---|---|
| 21 | 0 | 178 | 92 | 144 | 219 | 279 |
| 22 | 0.02[a] | 2500 | 91 | 122 | 235 | 283 |
| 23 | 0.02[b] | 4167 | 87 | 117 | 238 | 281 |

[a]p-Iodobenzoic acid added after the first 30 minute of the 235° C. hold.
[b]p-Iodobenzoic acid added with the DCB and NMP.

Run 21 gave a polymer with a melt flow of 178 g/10 min. The polymer from run 22 had a melt flow of 2500 g/10 min (extrusion rate of 8.7 g/10 min). Run 23 produced a polymer with a melt flow rate of 4167 g/10 min (extrusion rate of 56).

The p-iodobenzoate formed during the PPS polymerization (runs 22 and 23) resulted in a significant decrease in PPS molecular weight compared with the control run 21. In addition, polymers made with p-iodobenzoate had faster crystallization from the cold (Tcc) or from the melt (Tmc). FTIR spectroscopy of the polymers from runs 22 and 23 substantiated that carboxyl groups had been incorporated into the polymer.

That which is claimed is:

1. A process for preparing arylene sulfide polymers comprising the steps of:
   (a) contacting at least one sulfur source, at least one cyclic organic amide, and at least one dihaloaromatic compound to form a polymerization mixture,
   (b) subjecting said polymerization mixture to polymerization conditions of temperature and time sufficient to form said arylene sulfide polymer, and
   (c) recovering said arylene sulfide polymer, wherein said process is conducted in the presence of a compound having the formula wherein X is selected from the group consisting of bromine and iodine, Y is a non-activating or deactivating group and is selected from the group consisting of R' and R" are hydrogen or an alkyl group having 1 to about 15 carbon atoms, and Ar' is selected from the group consisting of wherein is obtained by addition of the corresponding carboxylate salt or is prepared in-situ by reaction of the free carboxylic acid with a stoichiometric amount of a base, and wherein —O⁻ is obtained by addition of the corresponding phenoxide or is prepared in-situ by reaction of the corresponding phenol with a stoichiometric amount of base.

2. A process according to claim 1 wherein the molar ratio of said compound to said sulfur source is about 0.002:1 to about 0.2:1.

3. A process according to claim 2 wherein said compound is added with said at least one dihaloaromatic compound to produce said polymerization mixture.

4. A process according to claim 2 wherein said compound is added during the time said polymerization mixture is being subjected to polymerization conditions.

5. A process according to claim 3 wherein said sulfur source is selected from the group consisting of alkali metal sulfides, alkali metal bisulfides, N-methyl-2-pyrrolidinethione and hydrogen sulfide.

6. A process according to claim 5 wherein said polymerization mixture further comprises an alkali metal hydroxide.

7. A process according to claim 6 wherein said cyclic organic amide comprises N-methyl-2-pyrrolidone and wherein said dihaloaromatic compound is selected from the group consisting of p-dichlorobenzene, and mixtures of p-dichlorobenzene with a total of about 0 to about 10 mole percent of at least one of m-dichlorobenzene, o-dichlorobenzene and alkyl-substituted dichlorobenzene having the formula wherein R is hydrogen or an alkyl group of 1 to about 4 carbon atoms and at least one R is not hydrogen.

8. A process according to claim 7 wherein said alkali metal bisulfide comprises sodium bisulfide, said alkali metal hydroxide comprises sodium hydroxide, and said dihaloaromatic compound comprises p-dichlorobenzene.

9. A process according to claim 8 wherein said Y is selected from the group consisting of —H and wherein is obtained by addition of the corresponding carboxylate salt or is prepared in-situ by reaction of the free carboxylic acid with a stoichiometric amount of a base.

10. A process according to claim 4 wherein said sulfur source is selected from the group consisting of alkali metal sulfides, alkali metal bisulfides, N-methyl-2-pyrrolidinethione and hydrogen sulfide.

11. A process according to claim 10 wherein said polymerization mixture further comprises an alkali metal hydroxide.

12. A process according to claim 11 wherein said cyclic organic amide comprises N-methyl-2-pyrrolidone and wherein said dihaloaromatic compound is selected from the group consisting of p-dichlorobenzene, and mixtures of p-dichlorobenzene with a total of about 0 to about 10 mole percent of at least one of m-dichlorobenzene, o-dichlorobenzene, and alkyl-substitued dichlorobenzene having the formula wherein R is hydrogen or an alkyl group of 1 to about 4 carbon atoms and at least one R is not hydrogen.

13. A process according to claim 12 wherein said alkali metal bisulfide comprises sodium bisulfide, said alkali metal hydroxide comprises sodium hydroxide, and said dihaloaromatic compound comprises p-dichlorobenzene.

14. A process according to claim 13 wherein said Y is selected from the group consisting of —H and wherein is obtained by addition of the corresponding carboxylate salt or is prepared in-situ by reaction of the free carboxylic acid with a stoichiometric amount of a base.

15. A process according to claim 2 wherein said polymerization mixture further comprises an alkali metal carboxylate.

16. A process for preparing a poly(phenylene sulfide) comprising the steps of:
    (a) dehydrating an aqueous mixture comprising sodium bisulfide, sodium hydroxide and N-methyl-2-pyrrolidone thereby forming a dehydrated mixture,
    (b) contacting p-dichlorobenzene with said dehydrated mixture to produce a polymerization mixture,
    (c) subjecting said polymerization mixture to polymerization conditions of temperature and time sufficient to form said poly(phenylene sulfide), and
    (d) recovering said poly(phenylene sulfide), wherein said process is conducted in the presence of a compound having the formula wherein X is selected from the group consisting of bromine and iodine, Y is a non-activating or deactivating group and is selected from the group consisting of —H and wherein is obtained by addition of the corresponding carboxylate salt or is prepared in-situ by reaction of the free carboxylic acid with a stoichiometric amount of a base; and the molar ratio of said compound to said sodium bisulfide is about 0.004:1 to about 0.1:1.

17. An arylene sulfide polymer composition having end groups comprising the structure wherein Y is a non-activating or deactivating group and is selected from the group consisting of R' and R" are hydrogen or an alkyl group having 1 to about 15 carbon atoms and Ar' is selected from the group consisting of wherein is obtained by addition of the corresponding carboxylate salt or is prepared in-situ by reaction of the free carboxylic acid with a stoichiometric amount of a base, and wherein —O⁻ is obtained by addition of the corresponding phenoxide or is prepared in-situ by reaction of the corresponding phenol with a stoichiometric amount of base.

18. A composition according to claim 17 wherein said arylene sulfide polymer is poly(phenylene sulfide).

* * * * *